(12) United States Patent
Fudge

(10) Patent No.: US 7,489,745 B2
(45) Date of Patent: Feb. 10, 2009

(54) RECONFIGURABLE DIRECT RF BANDPASS SAMPLING RECEIVER AND RELATED METHODS

(75) Inventor: Gerald L. Fudge, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 532 days.

(21) Appl. No.: 11/247,338

(22) Filed: Oct. 11, 2005

(65) Prior Publication Data

US 2007/0081617 A1    Apr. 12, 2007

(51) Int. Cl.
  *H03K 9/00*  (2006.01)
  *H04L 27/00* (2006.01)
(52) U.S. Cl. ................................ 375/340; 375/355
(58) Field of Classification Search ............. 375/316, 375/340, 354, 355
See application file for complete search history.

(56) References Cited

U.S. PATENT DOCUMENTS

| | | | |
|---|---|---|---|
| 5,014,018 A | 5/1991 | Rodwell et al. | 333/20 |
| 5,454,007 A | 9/1995 | Dutta | 375/78 |
| 6,266,518 B1 | 7/2001 | Sorrells et al. | 455/118 |
| 6,507,624 B1 | 1/2003 | Jachim et al. | 375/316 |
| 6,574,459 B1 | 6/2003 | Kaminski et al. | 455/272 |
| 6,700,388 B1 | 3/2004 | Mayor et al. | 324/537 |
| 6,900,710 B2 | 5/2005 | Agoston et al. | 333/248 |
| 7,107,033 B2 | 9/2006 | du Toit | 455/296 |
| 2002/0161300 A1 | 10/2002 | Hoff et al. | 600/449 |
| 2003/0016762 A1 | 1/2003 | Martin et al. | 375/308 |
| 2003/0054783 A1 | 3/2003 | Mason et al. | 455/307 |
| 2005/0069046 A1 | 3/2005 | Tsui et al. | 375/260 |

OTHER PUBLICATIONS

Arthur, "Modern SAW-based pulse compression systems for radar applications, Part I: SAW matched filters," Electronics & Communication Engineering Journal, Dec. 1995, pp. 236-246.

Arthur, "Modern SAW-based pulse compression systems for radar applications, Part II: Practical systems," Electronics & Communication Engineering Journal, Apr. 1996, pp. 57-78.

(Continued)

*Primary Examiner*—David B Lugo
(74) *Attorney, Agent, or Firm*—O'Keefe, Egan, Peterman & Enders, LLP

(57) ABSTRACT

Reconfigurable direct radio frequency (RF) bandpass sampling receivers are disclosed that provide direct RF sampling of an input signal spectrum passed through a bandpass filter that is tunable over a wide frequency range of interest and that is sampled based on the bandwidth of the filter rather than the bandwidth of the total frequency range of interest. The bandwidth of the filter may further be variable to provide for optimized search against a variety of signal bandwidths. The reconfigurable direct RF bandpass sampling receiver may be implemented with a single fixed clock for applications where the signals of interest lie in adjacent non-overlapping frequency channels. For applications requiring arbitrary tuning, the reconfigurable direct RF bandpass sampling receiver can also use a programmable or switched sampling clock to avoid the Nyquist sample boundaries that occur with bandpass sampling and thus provide sampling of arbitrary frequencies. A high-speed analog pre-sampler may be included to extend the maximum frequency range that can be sampled.

18 Claims, 1 Drawing Sheet

OTHER PUBLICATIONS

Brandl et al., "High Speed Signal Processing with Tapped Dispersive SAW based Delay Lines," University of Technology, Applied Electronics Laboratory, Vienna Austria, IEEE 2000, pp. 171-176.

Burke, "Ultra-Linear Chirp Generation Via VCO Tuning Predistortion," AIL Systems, Inc., Deer Park, New York, IEEE 1994 MTT-S Digest, pp. 957-960.

Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.

Ong et al., "Digital LPI Radar Detector," Naval Postgraduate School Thesis, Monterey, California, Mar. 2001, pp. 1-81.

Grant et al., "Recent Advances in Analog Signal Processing," IEEE 1990, IEEE Transactions on Aerospace and Electronic Systems, vol. 26, No. 5, Sep. 1990, pp. 818-849.

Li et al, "On the Use of a Compressive Receiver for Signal Detection," IEEE 1991, IEEE Transactions on Communications, vol. 39, No. 4, Apr. 1991, pp. 557-566.

Levy et al, "VCO Based Chirp Generation for Broad Bandwidth Compressive Receiver Applications," AIL Systems, Inc., Deer Park, New York, IEEE 1993 MTT-S Digest, pp. 1113-1115.

Lucyszyn, "Review of radio frequency microelectromechanical systems technology," Imperial College, London, IEE Proc.-Sci. Meas. Technol.vol. 151, No. 2, Mar. 2004, pp. 93-103.

Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.

Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.

Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.

Serhan et al., "Automatic Frequency Control Techniques For Microwave Active Filters," Limoges University, Limoges, France, 1997 IEEE MTT -S Digest, pp. 697-700.

Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.

Agoston et al, "100 GHz Through-Line Sampler System with Sampling Rates in Excess of 10 G samples/second," Picosecond Pulse Labs, Boulder, Colorado, PSPL—100 Sampler Paper—Submitted to MTT 2003, http://www.picosecond.com->products->sampler modules, 3 pgs.

Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.

Akos et al, "Direct Bandpass Sampling of Multiple Distinct RF Signals," 1999 IEEE Transactions on Communications, Vo. 47, No. 7, Jul. 1999, pp. 983-988.

Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.

Brown et al, "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.

Copeland et al, "5-GHz SiGe HBT Monolithic Radio Transceiver with Tunable Filtering," 2000 IEEE Transactions on Microwave Theory and Techniques, vol. 48, No. 2, Feb. 2000, pp. 170-181.

Deleniv et al, "Tunable Ferroelectric Filter-Phase Shifter," University of Technology, Gothenburg, Sweden, 2003 IEEE MTT-S Digest, pp. 1267-1270.

Juodawlkis et al, "Optical Down-Sampling of Wide-Band Microwave Signals," Invited Paper, Journal of Lightwave Technology, vol. 21, No. 12, Dec. 2003, pp. 3116-3124.

Karvonen et al, "A CMOS Quadrature Charge-Domain Sampling Circuit with 66-dB SFDR Up to 100 MHz," 2005 IEEE Transactions on Circuits and Systems -I: Regular Papers, vol. 52, No. 2, Feb. 2005, pp. 292-304.

Koc et al, "Direct RF Sampling Continuous-Time Bandpass /spl Delta/-/spl Sigma/A/D Converter Design for 3G Wireless Applications," ISCAS 2004, May 23-26, 2004, vol. 1, pp. 409-412.

Latiri et al, "A reconfigurable RF sampling receiver for multistandard applications," Comptes Rendus Physique 7 (2006), pp. 785-793.

Lindfors et al, "A 3-V 230- MHz CMOS Decimation Subsampler," 2003 IEEE Transactions on Circuits and Systems—II: Analog and Digital Signal Processing, vol. 50. No. 3, Mar. 2003, pp. 105-117.

Loper, "A Tri-Phase Direct Conversion Receiver," Rockwell International, MILCOM 1990, Sep. 30-Oct. 3, 1990, pp. 1228-1232.

Luy et al, "Configurable RF Receiver Architecture," Daimler-Chrysler Research and Tecnology, Ulm, Germany, 2004 IEEE Microwave Magazine, Mar. 2004, pp. 75-82.

Minnis et al, "A Highly Digitized Multimode Receiver Architecture for 3G Mobiles," 2003 IEEE Transactions on Vehicular Technology, vol. 52, No. 3, May 2003, pp. 637-653.

Mirabbasi et al, "Classical and Modern Receiver Architectures," University of Toronto, 2000 IEEE Communications Magazine, Nov. 2000, pp. 132-139.

Mostafa et al, "WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.

Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.

Namgoong et al., "Direct-Conversion RF Receiver Design," 2001 IEEE Transactions on Communications, vol. 49, No. 3, Mar. 2001, pp. 518-529.

Pellon, "RF-to-Digital Receivers Employing Bandpass Multibit /spl Sigma//spl Delta/ ADC Architectures," Lockheed Martin Government Electronic Systems, Morristown, New Jersey, 20th Annual Gallium Arsenide Integrated Circuit (GaAs IC) Symposium, Nov. 1-4, 1998, pp. 11-14.

"Real-Time Sampling Downconverter Front Ends for Digital Radar and Wide-Bank Signaling," Picosond Pulse Labs, 2500 55th Street, Boulder, CO 80301, (Nov. 2004).

Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.

Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.

Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.

Tatu et al, "Ka-Band Direct Digital Receiver," 2002 IEEE Transactions on Microwave Theory and Techniques, vol. 50, No. 11, Nov. 2002, pp. 2436-2442.

Tayebati et al, "Microelectromechanical tuneable filters with 0.47 nm linewidth and 70nm tuning range," Electonics Letters, Jan. 8, 1998, vol. 34, No. 1, pp. 76-78.

Thor et al, "A Direct RF Sampling Multifrequency GPS Receiver," Stanford University, Position Location and Navigation Symposium, 2002 IEEE, Apr. 15-18, 2002, pp. 44-51.

Tsui et al, "Digital Microwave Receiver Technology," Invited Paper, 2002 IEEE Transactions on Microwave Theory and Techniques, vol. 50, No. 3, Mar. 2002, pp. 699-705.

Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.

Vaughan et al, "The Theory of Bandpass Sampling," 1991 IEEE Transactions on Signal Processing, vol. 39, No. 9, Sep. 1991, pp. 1973-1984.

Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog—to- Digital Converters and Their Applications in Radio Receivers," 1995 IEEE Communications Magazine, May 1995, pp. 39-45.

U.S. Appl. No. 60/373,163, filed Apr. 17, 2002, "Tunable modules for frequency agile receivers."

PCT International Search Report, PCT/US2006/039615, Apr. 2, 2007.

PCT International Application No. PCT/US06/39506, "*International Search* Report," filed Oct. 10, 2006.

US 7,489,745 B2

RECONFIGURABLE DIRECT RF BANDPASS SAMPLING RECEIVER AND RELATED METHODS

RELATED APPLICATIONS

This subject matter of this Application is related in part to the subject matter described in concurrently filed application Ser. No. 11/247,314, entitled "SWEPT BANDPASS FILTER FREQUENCY MODULATED CONTINUOUS WAVE (FMCW) RECEIVER AND RELATED METHOD," which is hereby expressly incorporated by reference in its entirety.

TECHNICAL FIELD OF THE INVENTION

This invention relates to receiver architectures for the efficient sampling of radio frequency (RF) signals and, more particularly, to receiver architectures for the efficient sampling of signals over a wide frequency range of interest.

BACKGROUND

A wide variety of signals and related protocols exist for the use of radio frequency (RF) signals in communication systems and other devices, such as radar systems. In some applications, it is desirable to determine or confirm the existence of RF signals and accurately measure their parameters. RF signals of interest, however, can occur across a wide range of center frequencies with various bandwidths and can have relatively small signals compared to background noise. As such, it is desirable for an RF receiver to be designed to acquire and allow the detection and measurement of signals across a wide frequency range with various bandwidths while contributing little distortion, spurs or interference from its own circuitry. For a electronic intelligence application, for example, the desired signals to be acquired and detected can fall within a frequency range from less than 2 GHz to greater then 20 GHz. To provide reasonable sensitivity against a variety of signal types and bandwidths while maximizing search coverage, typical instantaneous search bandwidths may range from 100 MHz or less to 1 GHz or greater.

Many receiver architectures currently exist for receiving and detecting RF signals. These architectures include heterodyne receivers, homodyne receivers (also called zero-IF and direct conversion receivers for intermediate frequency (IF) applications), low-IF receivers, double conversion wideband IF receivers, wideband digital receivers, 6-port receivers (a special case of homodyne receivers), 3-phase variations of homodyne receivers, charge-domain direct RF mixer-sampler receivers, compressive receivers, noise-shaping sigma-delta receivers, non-reconfigurable direct RF optical down-sampling receivers, bandpass sampling variations of heterodyne receivers, and optical tuned channelized filters for fiberoptic WDM (wavelength division multiplexed) receivers. In addition, multi-signal bandpass sampling receivers combining the outputs from multiple bandpass filters without tuning have been proposed. In addition, noise-shaping sigma delta converters that use a bank of bandpass filters to implement a tuning function with a modulation sampling clock meeting the Nyquist criteria for the total frequency range of interest have been designed. In addition, direct RF receivers based on the use of analog high-speed pre-samplers have been built, although not in any reconfigurable architecture. Still further, combination architectures have been utilized such as a combination of switched homodyne receiver and low-IF receiver architectures. Each of these prior architectures suffer certain disadvantages and, therefore, have not been entirely effective in receiving and detecting RF signals, particularly in applications requiring large degrees of reconfigurability where the frequency range of interest is very large and extends to many GHz and the instantaneous bandwidth of interest may vary, such as electronic intelligence applications.

SUMMARY OF THE INVENTION

The present invention provides a reconfigurable direct radio frequency (RF) bandpass sampling receiver that provides direct RF sampling of an input signal spectrum passed through a bandpass filter that is tunable over a wide frequency range of interest and which is sampled based on the bandwidth of the filter rather than the bandwidth of the total frequency range of interest. The bandwidth of the filter may further be variable to provide for optimized search against a variety of signal bandwidths. The reconfigurable direct RF bandpass sampling receiver may be implemented with a single fixed clock for applications where the signals of interest lie in adjacent non-overlapping frequency channels. For applications requiring arbitrary tuning, the reconfigurable direct RF bandpass sampling receiver can also use a programmable or switched sampling clock to avoid the Nyquist sample boundaries that occur with bandpass sampling and thus provide sampling of arbitrary frequencies. A high-speed analog pre-sampler may be included to extend the maximum frequency range that can be sampled. As described in more detail below, other systems and methods can be utilized as part of the present invention.

In one embodiment, the present invention is receive path circuitry for a reconfigurable direct RF bandpass sampling receiver including bandpass filter circuitry and sampling circuitry. The bandpass filter circuit has a tunable center frequency dependent upon a filter control signal where the center frequency is tunable across a frequency range of interest and where the tunable bandpass filter has a bandwidth less than the frequency range of interest. The sampling circuitry is configured to receive a filtered signal from the tunable bandpass filter circuitry and to receive a bandpass sampling clock signal as an input where the bandpass sampling clock signal meets Nyquist sampling criteria of the bandpass filter but does not meet Nyquist sampling criteria of the total frequency range of interest. In addition, the receive path circuitry can further include clock generation circuitry coupled to provide the sampling clock signal to the sampling circuitry where the clock generation circuitry is configured to generate at least two selectable sampling clock signals. Each sampling clock signal is then configured to correspond to a different frequency so that Nyquist boundaries associated with the first sampling clock signal are different from the Nyquist boundaries associated with the second sampling clock signal. Still further, the clock generation circuitry can be configured to select the second sampling clock signal when the bandwidth for the bandpass filter circuitry includes a Nyquist boundary for the first sampling clock signal. In addition, the sampling circuitry can include an analog to digital converter (ADC) and high-speed analog pre-sampling circuitry configured to capture a signal before the ADC to allow sampling by the ADC in cases when a frequency of the signal is above an effective bandwidth of the ADC. The bandpass filter circuitry can also be configured to have an adjustable bandwidth that is dependent upon a bandwidth control signal. As described below, other features and variations can be implemented, if desired, and related methods can be utilized, as well.

In another embodiment, the present invention is a method for direct sampling of signals including tuning a center frequency for a bandpass filter within a frequency range of interest where the bandpass filter has a bandwidth no more than half of the frequency range of interest, bandpass sampling a filtered signal from the bandpass filter circuitry according to a sampling clock signal that meets Nyquist criteria for the bandpass filter but does not meet Nyquist criteria for the total frequency range of interest. The method can further include sampling a filtered signal from the bandpass filter circuitry according to a second sampling clock signal depending upon a location for the center frequency where Nyquist boundaries associated with the first sampling clock signal are different from the Nyquist boundaries associated with the second sampling clock signal. Still further, the method can include selecting the second sampling clock signal when the bandwidth for the bandpass filter circuitry includes a Nyquist boundary for the first sampling clock signal. In addition, the sampling step can include utilizing an analog to digital converter (ADC) to sample the filtered signal and utilizing high-speed analog pre-sampling circuitry to capture a signal before the sampling step to allow sampling by the ADC in cases when a frequency of the signal is above an effective bandwidth of the ADC. The method can further include adjusting the bandwidth for the bandpass filter circuitry. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
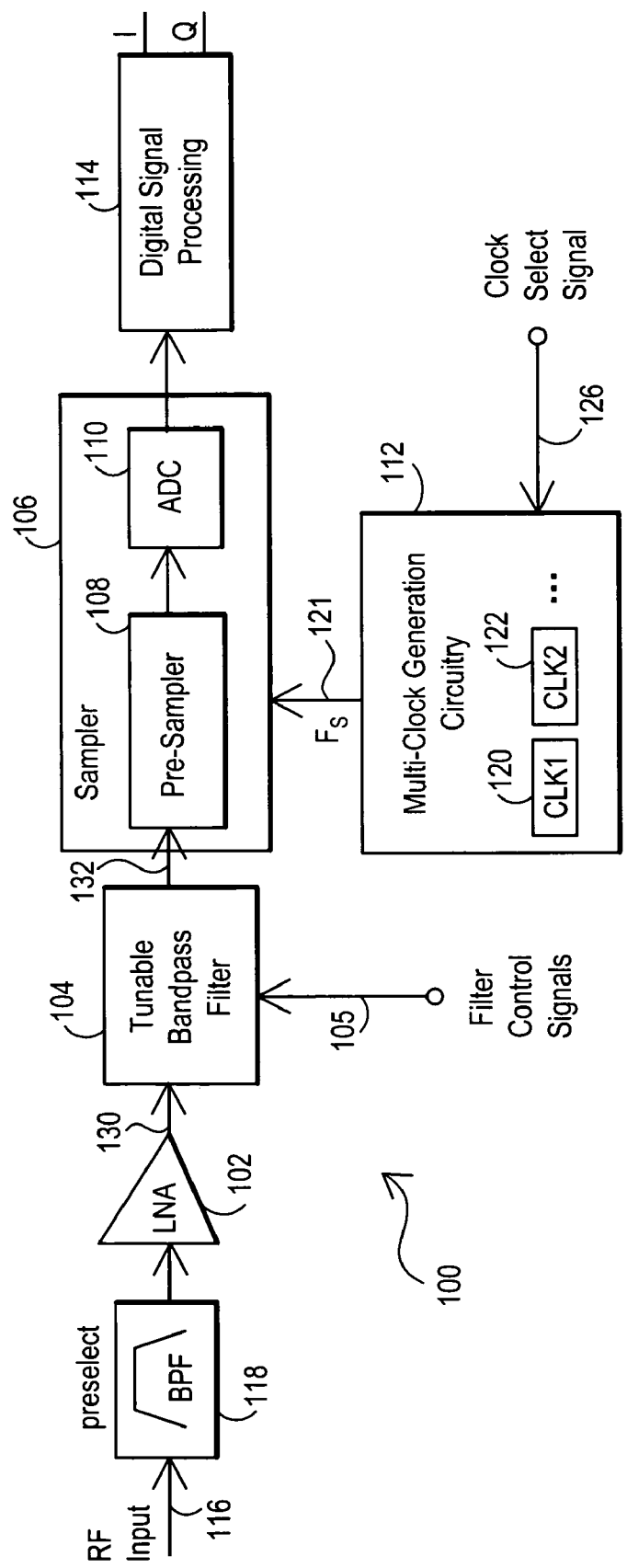
FIG. 1 is a block diagram of an embodiment for a reconfigurable direct radio-frequency (RF) sampling receiver according to the present invention.

The present invention provides a reconfigurable direct radio frequency (RF) bandpass sampling receiver that provides direct RF sampling of an input signal spectrum passed through a bandpass filter that is tunable over a wide frequency range of interest and which is sampled based on the bandwidth of the filter rather than the bandwidth of the total frequency range of interest. The bandwidth of the filter may further be variable to provide for optimized search against a variety of signal bandwidths. The reconfigurable direct RF bandpass sampling receiver may be implemented with a single fixed clock for applications where the signals of interest lie in adjacent non-overlapping frequency channels. For applications requiring arbitrary tuning, the reconfigurable direct RF bandpass sampling receiver can also use a programmable or switched sampling clock to avoid the Nyquist sample boundaries that occur with bandpass sampling and thus provide sampling of arbitrary frequencies. A high-speed analog pre-sampler may be included to extend the maximum frequency range that can be sampled. In an electronic intelligence (ELINT) application, this reconfigurable direct RF bandpass sampling receiver architecture of the present invention provides a method for achieving a much smaller receiver form factor than previously achieved. The present invention also provides a way to achieve better spur performance with less phase noise by tuning the filter, instead of tuning the RF signal, and then by performing bandpass sampling (i.e., sampling at a non-DC frequency). The present invention also provides the optional use of two or more clock sampling frequencies (i.e., Fs1, Fs2 . . . ) to allow adjustment of the Nyquist boundaries which occur at integer multiples of Fs/2.

Although direct RF down-sampling receivers using optical technology have been used, these receivers convert a fixed section of RF bandwidth and are not tunable. Although direct RF bandpass sampling receivers have been proposed, no solution has been presented in prior art to allow direct RF bandpass sampling with tuning over a wide frequency range of interest. Although sampling with switched bandpass filters to implement adjacent channel tuning in a Nyquist-sampled sigma delta architecture has been used, this architecture is fundamentally limited in tuning to higher RF frequencies because of the need for the modulation clock to meet Nyquist sampling criteria for the maximum frequency; furthermore this architecture does not provide arbitrary tuning. In addition, direct RF receivers based on the use of analog high-speed pre-samplers have been built, although not in any reconfigurable architecture. The reconfigurable direct RF bandpass sampling receiver architecture of the present invention effectively combines aspects of other architectures into a particularly advantageous solution. The present invention is particularly advantageous for applications requiring a wide range of center frequencies extending to very high frequencies such as where signal frequencies are in a range from 2 GHz or lower to 10 or 20 GHz and higher. As such, the receiver architecture of the present invention is advantageous for us in wide frequency range of interest ELINT receiver implementations.

FIG. 1 is a block diagram of an embodiment 100 for a direct radio-frequency (RF) bandpass sampling receiver according to the present invention. As depicted, the radio frequency (RF) input signal 116 is first passed through an optional pre-select bandpass filter (BPF) 118 and then to a low noise amplifier (LNA) 102. The output 130 of the LNA 102 is provided to a tunable bandpass filter 104, which can be configured to have a tunable center frequency and a programmable bandwidth dependent upon one or more filter control signals 105. The filtered output signal 132 is received by sampler or sampling circuitry 106, which can include a high speed analog pre-sampler 108 and analog-to-digital converter (ADC) circuitry 110. The digital output signals from sampling circuitry 106 are then further processed by digital signal processing (DSP) circuitry 114 to produce baseband in-phase path (I) and quadrature path (Q) signals. The sampler 106 receives a sampling clock (Fs) input signal 121 at a desired sampling frequency. This sampling clock (Fs) signal 121 determines the sampling frequency for the sampling circuitry 106.

This sampling clock (Fs) input signal 121 can be generated by multi-clock generation circuitry 112. As depicted, the multi-clock generation circuitry 112 generates two or more clock signals that can be selected and used as sampling clocks (CLK1, CLK2 . . . ) for the sampling clock signal 121 that is provided to sampling circuitry 106. As shown, two or more clock signals can be generated by the multi-clock generation circuitry 112, namely, a first clock signal (CLK1) 120, a second clock signal (CLK2) 122, and any number of additional clock signals, as desired. A clock select signal 126 is provided to the multi-clock generation circuitry 112 to select which of the clock signals will be used as the output clock signal for the sampling clock signal (Fs) 121 to the sampling circuitry 106. It is also noted that multi-clock generation circuitry 112 could be implemented using a wide variety of clock circuits. For example, the multi-clock generation circuitry 112 could be configured to always generate multiple clocks from which a sampling clock is selected. Alternatively, the multi-clock generation circuitry 112 could be configured to generate a single output clock signal that is adjusted according to the clock select signal 126 to provide a programmable clock output signal at the desired sampling frequency. Other variations could be provided, as desired. It is also noted that in some embodiments a single clock signal could be utilized, if desired. In such an implementation, the clock generation circuitry 112 would provide a single fixed sampling clock output signal for the sampling circuitry 106.

As described herein, it is noted that these different clock signals allow for selection of an appropriate sampling clock based on meeting the Nyquist criteria of the bandpass filter and based on criteria so as to avoid Nyquist sampling problems due to Nyquist boundaries. Nyquist zones are determined by the sampling rate for the sampling circuitry 106, and Nyquist criteria locate sampling zone boundaries at integer (K=0, 1, 2, 3 . . . ) multiples of $f_s/2$ starting at DC (frequency=0 Hz). In addition, Nyquist zones alternate between non-inverted and inverted spectrums. Traditional Nyquist criteria states that for bandpass sampling, the sampling rate must be two-times or greater than the bandwidth of the signal frequency range of interest, and that for baseband sampling, the sampling rate must be two-times or greater than the maximum frequency for the signal frequency range of interest.

As frequency ranges within the signal input spectrum are analyzed, depending upon the sampling frequency for the sampling circuitry 106, one or more Nyquist boundaries could be crossed during processing. Thus, by having multiple sampling clock signals available, when a Nyquist boundary for a first sampling clock signal is being reached during processing across a frequency range, a switch can be made to using a second sampling clock signal. As such, the Nyquist boundary will also change based upon this new sampling frequency. In operation, therefore, if the tunable bandpass filter 104 is tuned to a new frequency and its bandwidth includes a Nyquist boundary, a switch could be made to an alternative sampling frequency so that reconstruction problems at the Nyquist boundaries can be avoided. Thus, with proper selection of the sampling clock signals, the respective Nyquist zone boundaries for these sampling clock frequencies can be made far enough apart so that Nyquist sampling problems for the first sampling clock can be avoided by switching to the second sampling clock, and vice versa. In addition, as indicated above, the present invention is not limited to two clock signals, and any number of selectable clock signal frequencies could be provided, as desired.

The reconfigurable direct RF bandpass sampling receiver architecture of the present invention has a number of advantages. As a direct RF receiver architecture, the receiver 100 can receive high frequency signals without using a mixer to down-convert the incoming RF signal. Instead, the receiver 100 relies upon aliased bandpass sampling within the sampling circuitry 106 in conjunction with the tunable filter 104 to directly down-convert the received signals. To allow sampling of very high frequency RF signals, a high-speed analog pre-sampler may be used. Because the receiver of the present invention does not utilize a mixer, it avoids phase noise, spurs and mixer products that typically result from generating a local oscillator (LO) mixing signal and mixing it with the incoming RF signal. The receiver of the present invention can also has faster response times in changing frequency because it does not need the LO to settle. In addition, the receiver uses less hardware and allows for a smaller form factor because no mixer and no tuner are utilized. It is also noted that the clock performance for the clock generation circuitry is preferably tight in order to avoid ADC jitter errors. Again, the multiple clock signals that can be utilized for the sampling clock signal (Fs) 121 are provided to help avoid non-recoverable zones around Nyquist boundaries as the tunable filter 104 is adjusted across a frequency band of interest for incoming signals 116. Because tunable bandpass filters are used, the reconfigurable direct RF bandpass sampling receiver can receive frequencies across a wide range of frequencies, unlike previously used optical-based direct RF down-sampling receivers. When implemented with multiple clocks, the reconfigurable direct RF bandpass sampling receiver can furthermore tune to arbitrary frequencies across a wide range of frequencies.

Example circuitry that may be utilized for the sampling circuitry 106 includes pre-samplers available from PICOSECOND PULSE LABS (PSPL) to allow sampling by an ADC in cases when the frequency of the signal is above the effective bandwidth of the ADC. Example circuitry that may be utilized for the tunable filter 104 includes tunable filter banks available from PARATEK. If desired, other tunable filter technologies could be utilized, such as tunable optical Mach-Zehnder filter technology, tunable image rejection notch filters, tunable bandpass filters based on active inductor technology, tunable filter that use thin film ferroelectric varactors to provide voltage controlled phase shifting, and tunable filters the use RF microelectromechanical systems (MEMS) technology.

Looking back to FIG. 1, it is noted that the preselect filter 118 is optional component (depending on application) to suppress frequencies outside the range of interest. It is also noted that the LNA 102 can be used to increase the gain to within range of the sampling circuitry 106 given any insertion losses of the tunable filter 104, and the LNA 102 can be used to provide for a desired noise FIGURE response. The LNA 102 can be implemented as desired, and the specific implementation for the LNA 102 will be technology and application dependent. In addition, the functionality of the LNA 102 may be split between different component, as desired (e.g., the gain may be spread to optimize for a specific cascade analysis). In some strong signal applications, an LNA may not be required.

The tunable filter 104 can be implemented as a narrowband filter that can be tuned over the frequency range of interest. For ELINT applications, the low end of the frequency range might be from 500 MHz to 2 GHz and the high end of the frequency range might be over 20 GHz. A typical instantaneous bandwidth of the tunable filter could be anywhere from 5% to 15% or more of the center frequency, or the tunable filter could be configured to have an instantaneous bandwidth ranging from 25 MHz to over 1 GHz. The tuning can be implemented via continuous tuning (e.g., a voltage controlled dielectric) or by closely spaced switched filter banks, or by a combination of continuous tuning and switched filter banks. Other implementations could also be used, if desired. Regardless of how the tuning is implemented, the basic form of the reconfigurable direct RF bandpass sampling receiver of the present invention is characterized by the ability to perform bandpass sampling (i.e., sampling at non-DC frequencies) with arbitrary center frequency over a large RF range of center frequencies. It is noted that if the instantaneous bandwidth approaches a large fraction of the center RF frequency, then the benefits of the reconfigurable direct RF bandpass sampling receiver over full bandwidth sampling will likely decrease. In a possibly limiting case, the instantaneous bandwidth equals the full range of the frequency range of interest, and no tuning is required for the tunable filter 104. At this point, the reconfigurable direct RF bandpass sampling receiver of the present invention becomes similar to a direct RF bandpass sampling receiver.

The sampler 106 can be a module that inputs the band-limited RF signal and performs analog to digital conversion. The sampler module may include a high-speed analog pre-sampler 108 configured to capture the signal prior to being processed by a sample-and-hold circuit of a typical analog to digital converter (ADC) to allow sampling by an ADC in cases when the frequency of the signal is above the effective bandwidth of the ADC. The ADC 110 can follow the pre-sampler 108. It is noted that the sampler module may be fully integrated and that for some applications the pre-sampler may not be required.

The DSP 114 can include additional digital processing for the received signals. For example, the DSP 114 can include filtering, decimation, conversion of the real sampled data to in-phase/quadrature-phase (I/Q) data, equalization, signal detection, and signal measurement. Additional post-processing DSP functions required by the specific application can also be integrated into the DSP 114, as desired, for the reconfigurable direct RF bandpass sampling receiver of the present invention.

It is noted that there are key differences between all prior bandpass sampling techniques and the reconfigurable direct RF bandpass sampling receiver of the present invention. One important difference is that the receiver architecture of the present invention uses a tunable bandpass filter 104 that can tune to many different Nyquist zones. A second important difference is that the receiver architecture of the present invention can be tuned to any arbitrary frequency between the minimum and maximum frequency range. To help achieve this result while covering multiple Nyquist zones, the receiver architecture of the present invention utilizes a second clock. By using a second clock, the reconfigurable direct RF bandpass sampling receiver of the present invention shifts the Nyquist boundary to a different location, allowing recovery of signals on the Nyquist boundary of the first clock. Prior solutions do not allow a continuous range of frequency coverage that crosses multiple Nyquist boundaries.

The reconfigurable direct RF bandpass sampling receiver of the present invention allows the flexibility of a reconfigurable heterodyne receiver with wideband frequency coverage without any oscillator-based tuning hardware, thus reducing cost, size, weight, and power (CSWAP) and improving performance in spur performance, tuning speed, and phase noise. In addition, the reconfigurable direct RF bandpass sampling receiver of the present invention has better dynamic range and improved CSWAP than receivers with instantaneous bandwidth equal to the full frequency range (such as wideband compressive receivers and full bandwidth digitizers). For typical wireless applications with frequency range under a few GHz, the reconfigurable direct RF bandpass sampling receiver of the present invention has similar advantages as a RF noise shaping sigma delta digital receiver. However, as the maximum frequency of interest increases, the reconfigurable direct RF bandpass sampling receiver of the present invention is advantageous over the RF noise shaping sigma delta digital receiver because the modulator sampling clock of the RF noise shaping digital receiver is constrained by the Nyquist criteria of the maximum frequency and thus must be at least twice the maximum frequency. Thus for applications such as ELINT/EW/ESM, the reconfigurable direct RF bandpass sampling receiver of the present invention is, therefore, superior to the RF noise shaping sigma delta digital receiver.

It is noted that the reconfigurable direct RF bandpass sampling receiver of the present invention also uses bandpass sampling, and there are a few key differences between all of prior bandpass sampling receivers and the reconfigurable direct RF bandpass sampling receiver. One important difference is that the reconfigurable direct RF bandpass sampling receiver uses a tunable bandpass filter that can tune to many different Nyquist zones. A second important difference is that the reconfigurable direct RF bandpass sampling receiver can be tuned to any arbitrary frequency between the minimum and maximum frequency range. In order to achieve this result while covering multiple Nyquist zones, the reconfigurable direct RF bandpass sampling receiver can use a second sampling clock so that the signal can be reconstructed at the Nyquist boundaries. By using a second clock, the reconfigurable direct RF bandpass sampling receiver effectively shifts the Nyquist boundary to a different location, allowing recovery of signals on the Nyquist boundary of the first clock. Prior solutions do not allow such a continuous range of frequency coverage crossing multiple Nyquist boundaries. The multi-signal bandpass sampling concept is limited partially by the fact that the filters are not reconfigurable, but more importantly, the filters are severely constrained in design to avoid overlapping aliased signal spectra. Thus, the reconfigurable direct RF bandpass sampling receiver more flexible than multi-signal bandpass sampling utilized in prior solutions.

Filter control signal 105 is typically used to set the tunable bandpass filter to a particular frequency and bandwidth and is stationary for a period of time before being reconfigured. Alternatively, the filter control signal 105 could be smoothly or rapidly changing (time-varying) in frequency and/or bandwidth similar to the swept bandpass filter receiver described in more detail in co-owned and concurrently filed application Ser. No. 11/247,314, entitled "SWEPT BANDPASS FILTER FREQUENCY MODULATED CONTINUOUS WAVE (FMCW) RECEIVER AND RELATED METHOD," which is hereby expressly incorporated by reference in its entirety. In the reconfigurable direct RF bandpass sampling receiver, however, the time-varying filter avoids having Nyquist boundaries inside the filter bandwidth. Nyquist boundaries may be avoided in the time-varying case by configuring the filter bandwidth to be less than the bandwidth of the particular Nyquist zone (i.e., bandpass region of interest) so that as the filter center frequency changes, the filter bandwidth is always within a single Nyquist zone, or they may be avoided by tuning to separate Nyquist zones while avoiding the boundaries by use of appropriate center frequency and filter bandwidth, or they may be avoided by time-varying the clock appropriately, or through a combination of these techniques. It is noted that in the case where the clock is time-varying to allow the time-varying filter to avoid Nyquist boundaries, signal reconstruction may be difficult, and thus a smoothly or rapidly changing (time-varying) clock would typically be avoided.

Because the physical architecture of the reconfigurable direct RF bandpass sampling receiver is similar to the physical architecture of the swept bandpass filter FMCW receiver, in principle the reconfigurable direct RF bandpass sampling receiver could be modified to function as a swept bandpass filter FMCW receiver by allowing the filter to be time-varying and by allowing the filter to cross Nyquist boundaries and by suitable modification of the DSP. Similarly, the swept bandpass filter FMCW receiver could, in principle, be modified to function as a single-clock embodiment of the direct RF bandpass sampling receiver by discrete tuning the frequency/bandwidth (rather than time-varying) or by appropriate choice of clock so that Nyquist boundaries are avoided as the filter sweeps, and by suitable modification of the DSP to allow reconstruction of the captured time-frequency bandwidth. It is noted that because of typical component limitations, a combined functionality receiver for either direct RF bandpass sampling and/or swept bandpass FMCW receiver would not perform as well and/or would cost significantly more; thus while a combined receiver could, in principle be built, this would not represent best practice. The swept bandpass FMCW receiver provides the best benefit as an IF receiver with a wide-band front-end tuner reducing the RF frequency to the low GHz range with the DSP optimized for detection and measurement of wide bandwidth FMCW signals, while the direct RF bandpass sampling receiver provides the best benefit as an RF receiver operating over a wide range of frequencies from the low GHz range to 20 GHz and above with the DSP optimized for general purpose signal reconstruction, detection, and measurement.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Receive path circuitry for a reconfigurable direct RF bandpass sampling receiver, comprising:
    bandpass filter circuitry having a tunable center frequency dependent upon a filter control signal, the center frequency being tunable across a frequency range of interest, and the tunable bandpass filter having a bandwidth less than the frequency range of interest;
    sampling circuitry configured to receive a filtered signal from the tunable bandpass filter circuitry and to receive a bandpass sampling clock signal as an input, the bandpass sampling clock signal meeting Nyquist sampling criteria of the bandpass filter but not meeting Nyquist sampling criteria of the total frequency range of interest; and
    clock generation circuitry coupled to provide the sampling clock signal to the sampling circuitry, the clock generation circuitry being configured to generate at least two selectable sampling clock signals, each sampling clock signal being configured to correspond to a different frequency so that Nyquist boundaries associated with the first sampling clock signal are different from the Nyquist boundaries associated with the second sampling clock signal.

2. The receive path circuitry of claim 1, wherein the first sampling clock signal is configured such that a plurality of Nyquist boundaries associated with the first sampling clock signal fall within the frequency range of interest.

3. The receive path circuitry of claim 2, wherein the second sampling clock signal is configured such that a plurality of Nyquist boundaries associated with the second sampling clock signal fall within the frequency range of interest.

4. The receive path circuitry of claim 3, wherein the clock generation circuitry is configured to select the second sampling clock signal when the bandwidth for the bandpass filter circuitry includes a Nyquist boundary for the first sampling clock signal.

5. The receive path circuitry of claim 3, wherein the sampling circuitry comprises an analog to digital converter (ADC).

6. The receive path circuitry of claim 5, wherein the sampling circuitry further comprises high-speed analog pre-sampling circuitry configured to capture a signal before the ADC to allow sampling by the ADC in cases when a frequency of the signal is above an effective bandwidth of the ADC.

7. The receive path circuitry of claim 1, wherein the bandpass filter circuitry is configured to have an adjustable bandwidth that is dependent upon a bandwidth control signal.

8. The receive path circuitry of claim 1, further comprising digital signal processing circuitry coupled to receive digital output signals from the sampling circuitry.

9. The receive path circuitry of claim 1, wherein the clock generation circuitry is configured to receive a clock select signal.

10. A method for direct sampling of signals, comprising:
    tuning a center frequency for a bandpass filter within a frequency range of interest, the bandpass filter having a bandwidth no more than half of the frequency range of interest;
    bandpass sampling a filtered signal from the bandpass filter circuitry according to a first sampling clock signal that meets Nyquist criteria for the bandpass filter but does not meet Nyquist criteria for the total frequency range of interest; and
    further sampling a filtered signal from the bandpass filter circuitry according to a second sampling clock signal depending upon a location for the center frequency; wherein Nyquist boundaries associated with the first sampling clock signal are different from the Nyquist boundaries associated with the second sampling clock signal.

11. The method of claim 10, further comprising configuring the first sampling clock signal such that a plurality of Nyquist boundaries associated with the first sampling clock signal fall within the frequency range of interest.

12. The method of claim 11, further comprising configuring the second sampling clock signal such that a plurality of Nyquist boundaries associated with the second sampling clock signal fall within the frequency range of interest.

13. The method of claim 12, further comprising selecting the second sampling clock signal when the bandwidth for the bandpass filter circuitry includes a Nyquist boundary for the first sampling clock signal.

14. The method claim 12, wherein the sampling step comprises utilizing an analog to digital converter (ADC) to sample the filtered signal.

15. The method of claim 14, wherein the sampling step further comprises utilizing high-speed analog pre-sampling circuitry to capture a signal before the sampling step to allow sampling by the ADC in cases when a frequency of the signal is above an effective bandwidth of the ADC.

16. The method of claim 10, further comprising adjusting the bandwidth for the bandpass filter circuitry.

17. The method of claim 10, further comprising digitally processing digital output signals after the sampling step.

18. The method of claim 10, further comprising selecting a sampling clock signal based upon a clock select signal.

* * * * *